(12) United States Patent
Bevirt (10) Patent No.: US 8,297,566 B2
(45) Date of Patent: Oct. 30, 2012

(54) MOUNTING APPARATUS USING BALL AND SOCKET JOINTS WITH COMPOSITE CONNECTORS

(75) Inventor: JoeBen Bevirt, Santa Cruz, CA (US)

(73) Assignee: Day Men US, Inc, Petaluma, CA (US)

( * ) Notice: Subject to any disclaimer, the term of this patent is extended or adjusted under 35 U.S.C. 154(b) by 321 days.

(21) Appl. No.: 11/803,143

(22) Filed: May 11, 2007

(65) Prior Publication Data

US 2008/0093516 A1    Apr. 24, 2008

Related U.S. Application Data

(63) Continuation-in-part of application No. 11/324,994, filed on Jan. 3, 2006, now abandoned.

(51) Int. Cl.
*F16M 11/00* (2006.01)

(52) U.S. Cl. ............ 248/163.1; 248/106; 248/168; 248/177.1

(58) Field of Classification Search ............ 248/163.1, 248/160, 176.1, 178.1, 177.1, 181.1, 187.1, 248/220.21, 220.22, 224.8, 222.11, 221.11, 248/310, 316.7; 403/56
See application file for complete search history.

(56) References Cited

U.S. PATENT DOCUMENTS

| 1,255,577 | A | * | 2/1918 | Berry | 285/107 |
| 2,684,822 | A | * | 7/1954 | Odin | 248/179.1 |
| 4,085,915 | A | * | 4/1978 | Song et al. | 248/187.1 |
| 5,043,750 | A | * | 8/1991 | Yamaguchi | 396/428 |
| 5,752,097 | A | * | 5/1998 | McIntyre | 396/157 |
| 6,626,210 | B2 | * | 9/2003 | Luettgen et al. | 138/120 |
| D574,700 | S | * | 8/2008 | Bevirt | D8/382 |
| 7,533,906 | B2 | * | 5/2009 | Luettgen et al. | 285/146.1 |
| 2006/0226309 | A1 | * | 10/2006 | Pao | 248/122.1 |
| 2007/0154254 | A1 | * | 7/2007 | Bevirt | 403/56 |
| 2007/0212163 | A1 | * | 9/2007 | Bevirt | 403/56 |
| 2008/0056808 | A1 | * | 3/2008 | Bevirt | 403/56 |
| 2008/0069630 | A1 | * | 3/2008 | Bevirt | 403/56 |
| 2008/0093516 | A1 | * | 4/2008 | Bevirt | 248/181.1 |
| 2009/0101772 | A1 | * | 4/2009 | Bevirt | 248/180.1 |

* cited by examiner

*Primary Examiner* — Teri P. Luu
*Assistant Examiner* — Erin W Smith
(74) *Attorney, Agent, or Firm* — Michael A. Guth (57) ABSTRACT

The present invention is directed towards ball and socket joint connectors which, when interconnected, form a flexible assembly. Each connector includes a body with a first and second end portion. An external socket engaging surface is provided at one end of the body. The other end of the body has an internal cavity. The socket engaging surface of one connector is snapped into the internal cavity of another to interconnect the connectors. The internal cavity end portion may be of a material that is less subject to creep, and which may have high stiffness. The socket end portion may be made of a softer material that allows for sufficient deflection to allow for mating but is not as subject to creep as this portion is predominantly in compression.

4 Claims, 10 Drawing Sheets

SECTION A-A

SECTION A-A

FIGURE 10B

MOUNTING APPARATUS USING BALL AND SOCKET JOINTS WITH COMPOSITE CONNECTORS

CROSS REFERENCE TO RELATED APPLICATIONS

This application is a continuation in part of U.S. patent application Ser. No. 11/324,994 to Bevirt, filed Jan. 3, 2006 now abandoned, which is hereby incorporated by reference in its entirety.

BACKGROUND

1. Field of the Invention

The present invention relates to connectors which interconnect into a flexible assembly, and more specifically to a connectors and assemblies using ball and socket joint connectors.

2. Description of Related Art

Typical prior art ball and socket connectors are constructed out of the same material for both the ball and the socket. However, as most of the ball portion typically is under compressive stress, while most of the socket is under tensile stress, it may be desirable to use one material for the ball and another material for the socket.

Certain types of plastics may be well suited for ball and socket connectors but be subject to creep under tension. Thus, a connector made from a composite of materials may allow the benefits of differing materials to be realized.

SUMMARY

The present invention is directed towards ball and socket joint connectors which, when interconnected, form a flexible assembly. Each connector includes a body with a first and second end portion. An external socket engaging surface is provided at one end of the body. The other end of the body has an internal cavity. The socket engaging surface of one connector is snapped into the internal cavity of another to interconnect the connectors. The internal cavity end portion may be of a material that is less subject to creep, and which may have high stiffness. The socket end portion may be made of a softer material that allows for sufficient deflection to allow for mating but is not as subject to creep as this portion is predominantly in compression.

In some embodiments, the ball and socket joint connectors utilize an over-molded strip around the outside of the connector to facilitate in their use for gripping. In an exemplary embodiment utilizing the aforementioned ball and socket joint connectors, a mounting apparatus uses legs comprising the ball and socket joint connectors for support.

DETAILED DESCRIPTION

Figure 1A:
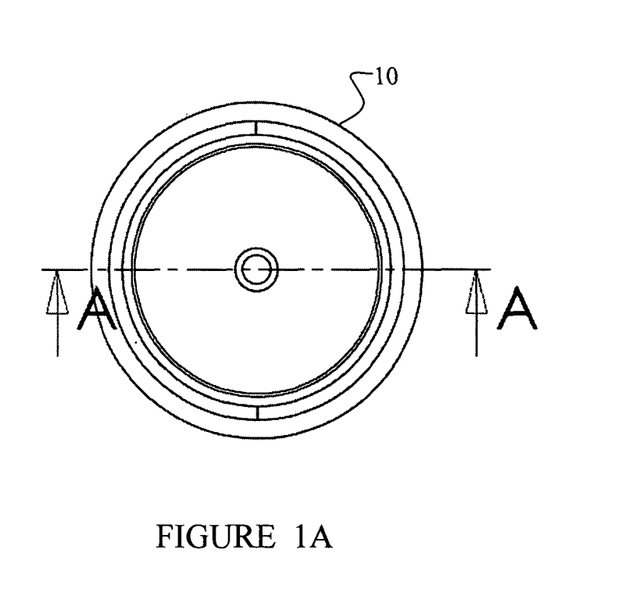
FIGS. 1A-B illustrate an end view and cross-sectional view of a composite connector according to some embodiments of the present invention.
Figure 1B:
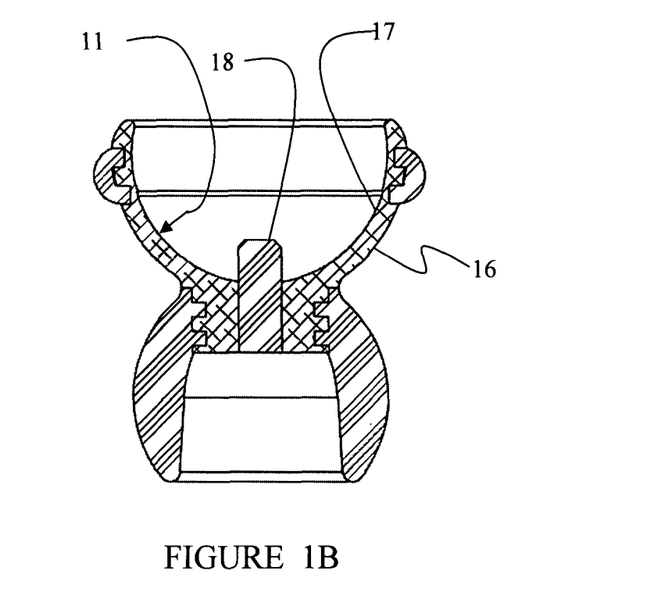
Figure 2A:
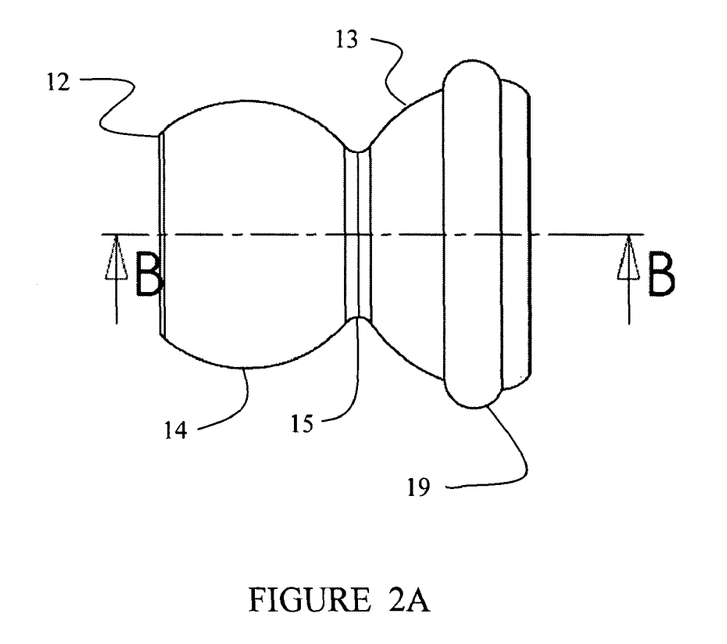
FIGS. 2A-B illustrate an side view and cross-sectional view of a composite connector according to some embodiments of the present invention.
Figure 2B:
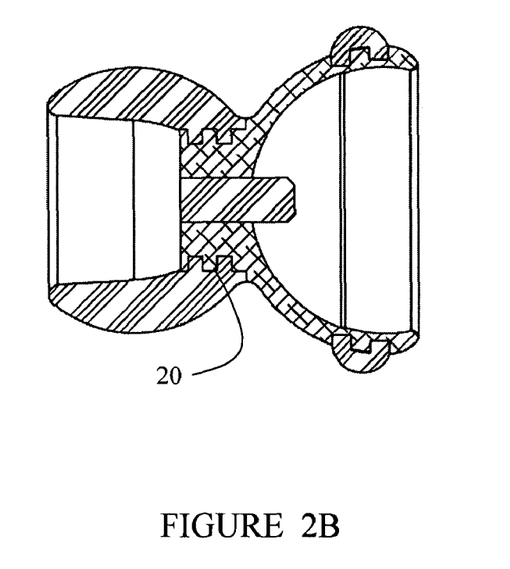
Figure 3A:
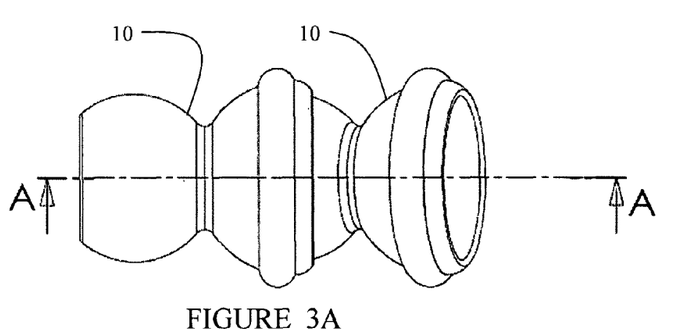
FIGS. 3A-B illustrate an end view and cross-sectional view of a pair of composite connectors according to some embodiments of the present invention.
Figure 3B:
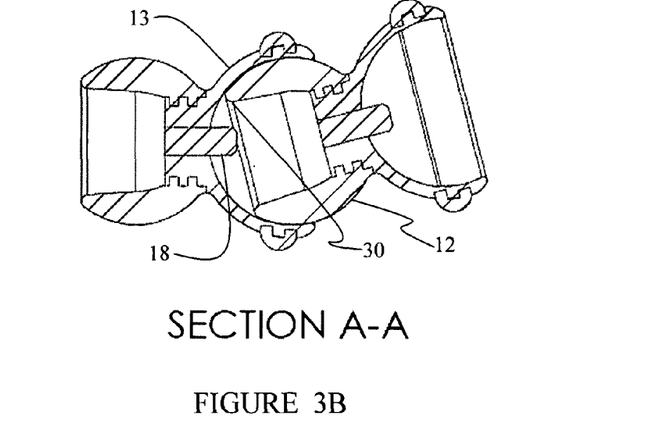

FIGS. 1 and 2 illustrate a ball and socket connector 10 according to some embodiments of the present invention. A connector 10 has a first end portion 12 and a second end portion 13. A socket engaging end surface 14 is present at the first end 12. The first end portion 12 is substantially hollowed out in some embodiments.

The second end portion 13 has a body 16 with an internal socket receiving cavity 17. The inner surface 11 of the an internal socket receiving cavity 17 is adapted to fit over the socket engaging end surface 14 of another connector 10, or of another piece with a similar socket engaging end surface. A neckdown 15 separates the first end portion 12 from the second end portion 13. A stop nub 18 acts as a mechanical stop to prevent over angulation and possible unintentional separation of a ball and socket joint connector pair.

The first end portion 12 and the second end portion 13 may be of different materials. For example, the socket engaging end surface 14, along with the rest of the first end portion 12, may be of an ABS plastic. The internal socket receiving cavity 17, as well as the second end portion 13, may be of another material, such as aluminum. The selection of differing materials may offer a variety of advantages. For example, the frictions between the two materials may be ideal for a particular use. Also, as in the case of using a metal such as aluminum, the connector may be much stiffer than a connector made solely of plastic. In the case of a support structure made of a length of connectors, the stiffness added to each connector may greatly affect the stiffness of the overall structure. This may be especially important with some types of support structures where wobbling or vibration interferes with the intended use, as may be the case with support structures for cameras and the like. The use of a stiffer material in the neckdown region 15 may also lead to a substantially stiffer structure when the connectors are used in an interconnected assembly.

Another distinct advantage of a composite connector may be that using a metal for the socket, which is primarily under tensile stress, as opposed to a plastic, reduces the likelihood over time of creep induced relaxation of the fit of the ball and socket. Also, if the ball and socket are ever disengaged, it may be that the plastic socket is more susceptible to permanent deformation, and the use of a metal socket may allow the connectors to be connected and disconnected in a manner that may not be suitable with all plastic connectors.

Although the foregoing discussion has involved plastic and metal, other combinations of materials may be used. For example, nylon may be used with plastic. Other suitable combinations may also be used. The connector may be symmetric around a primary axis in some embodiments. The end surface planes of the first and second end portions of the connector may be perpendicular to the primary axis in some embodiments.

In some embodiments, the bulk of the second end portion 13 may machined from metal, such as aluminum. The internal mating surface 11 of the socket receiving cavity 17 may be machined to a desired roughness. A series of grooves 20 may be left on the external surface of the second end portion to facilitate the molding of the first end portion 12 over the second end portion 13. A pin 18 may also be molded at the same time and of the same material. A grip strip 19 may be molded of the same material, or of a softer material, as desired. The grip strip may be added with a softer or more grippy material in a second molding process. Grooves or other structure may be present in the outer surface of the second end portion to better facilitate the adherence of the grip strip 19 to the second end portion.

Figure 4:
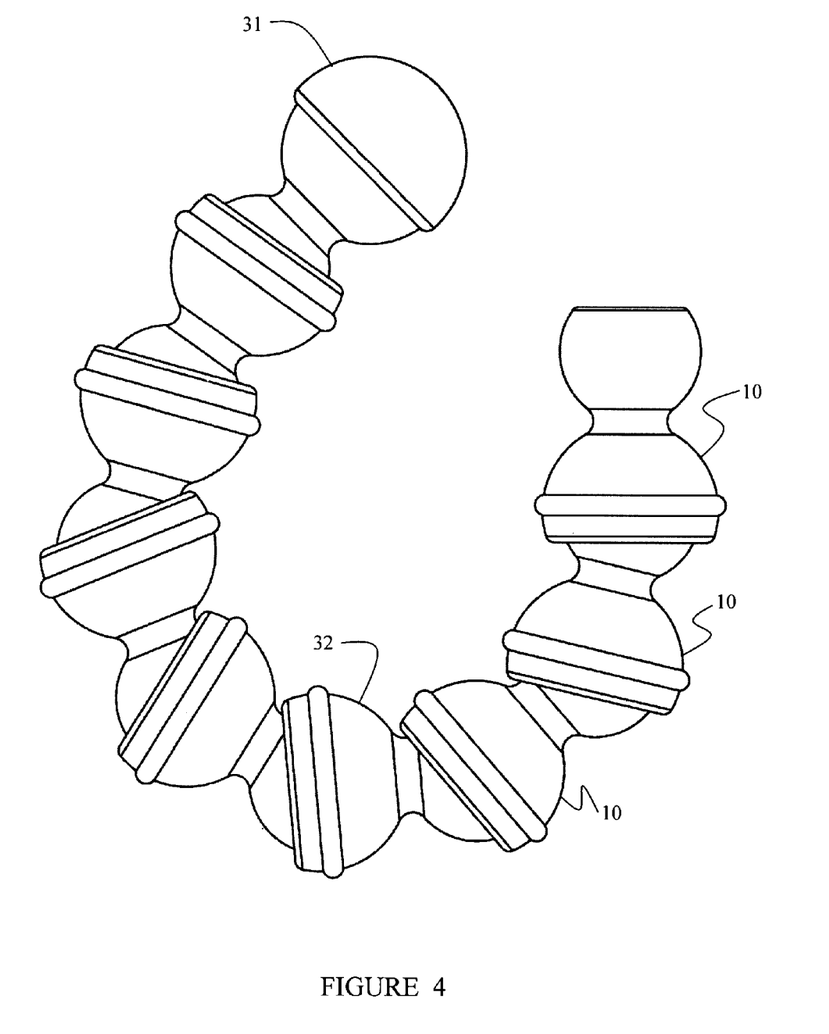
FIG. 4 illustrates a side view of a plurality of connected connectors according to some embodiments of the present invention.

In some embodiments of the present invention, as seen in FIG. 4, a flexible arm assembly 32 has been constructed out of a plurality of connectors 10. The flexible arm assembly may include a gripping pod 31 on one or both ends in some embodiments.

Figure 5:
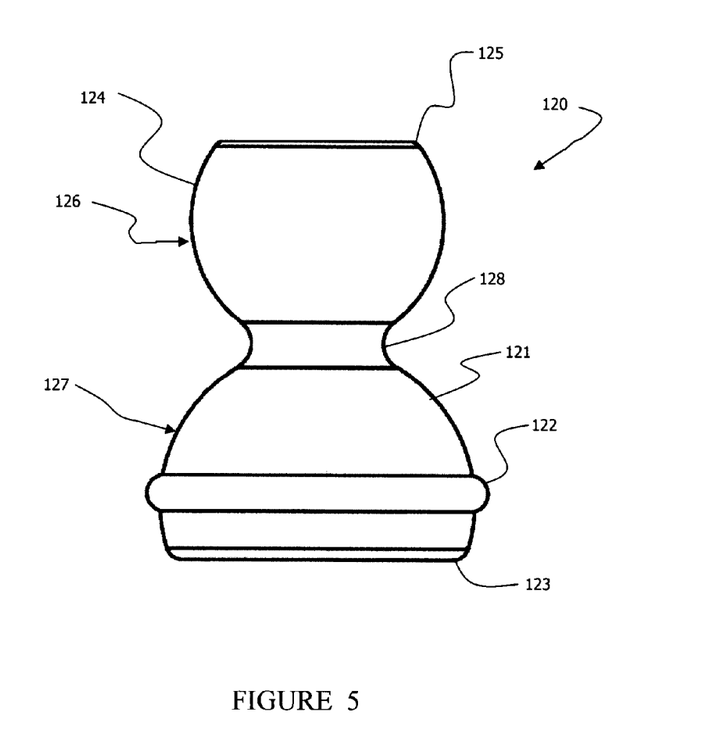
FIG. 5 is a side view of a connector according to some embodiments of the present invention.

In some embodiments, as seen in FIG. 5, a connector 120 includes a gripping portion 122. The connector 120 has a first end portion 125 and a second end portion 123. A socket engaging end surface 124 is present at the first end 125. The first end portion 125 may be substantially hollowed out in some embodiments.

The second end 123 has a body 121 with an internal socket receiving cavity. The inner surface of the an internal socket receiving cavity 130 is adapted to fit over the socket engaging end surface 124 of another connector, or of another piece with a similar socket engaging end surface. A neckdown 128 separates the first end portion 125 from the second end portion 123. A gripping portion 122 allows the connector to grip surfaces more readily. In some embodiments, the gripping portion is co-molded into the connector body. In some embodiments, the gripping portion is a rubberized compound. In some embodiments, the gripping portion is a circumferential ring molded into the outer surface of the connector. The gripping portion may provide a higher friction interface when the connector is set upon or wrapped around an object.

Figure 6:
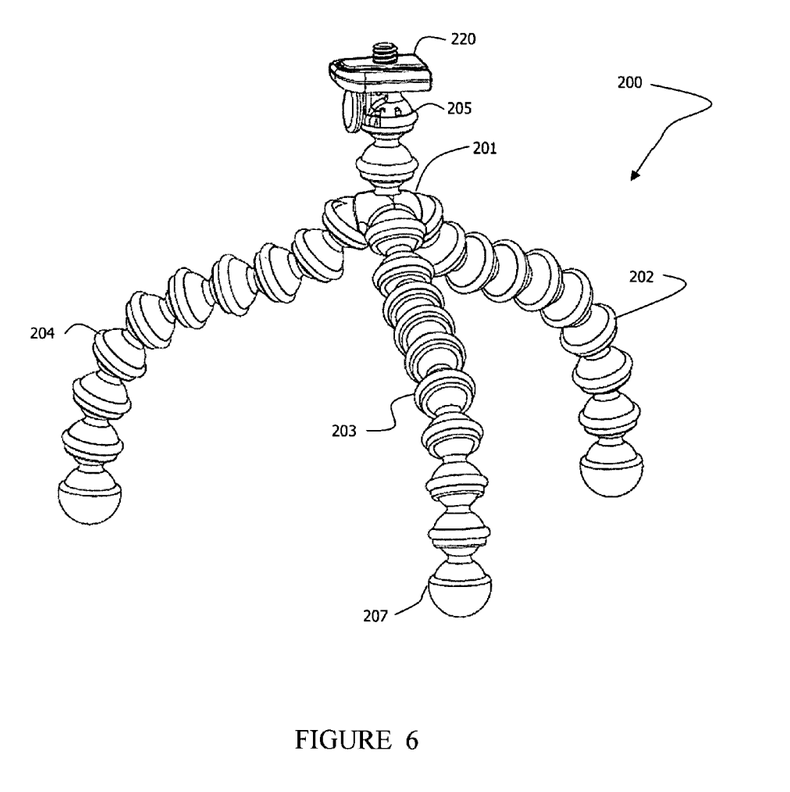
FIG. 6 is an illustration of a tripod apparatus according to some embodiments of the present invention.
Figure 7A:
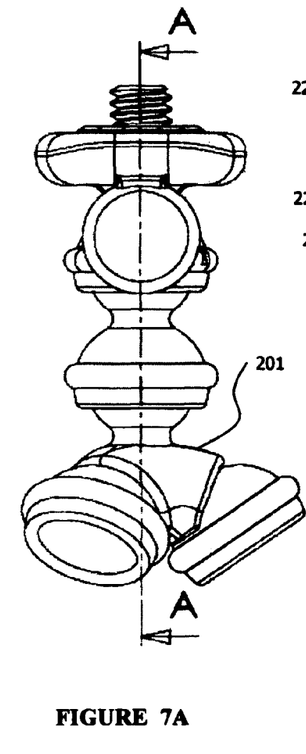
FIGS. 7A and 7B are a side and cross-sectional view of a body and interconnect portion of a tripod apparatus according to some embodiments of the present invention.
Figure 7B:
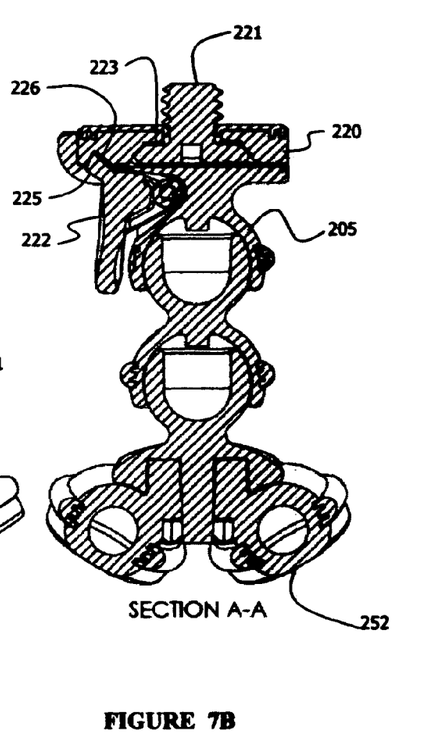
Figure 8:
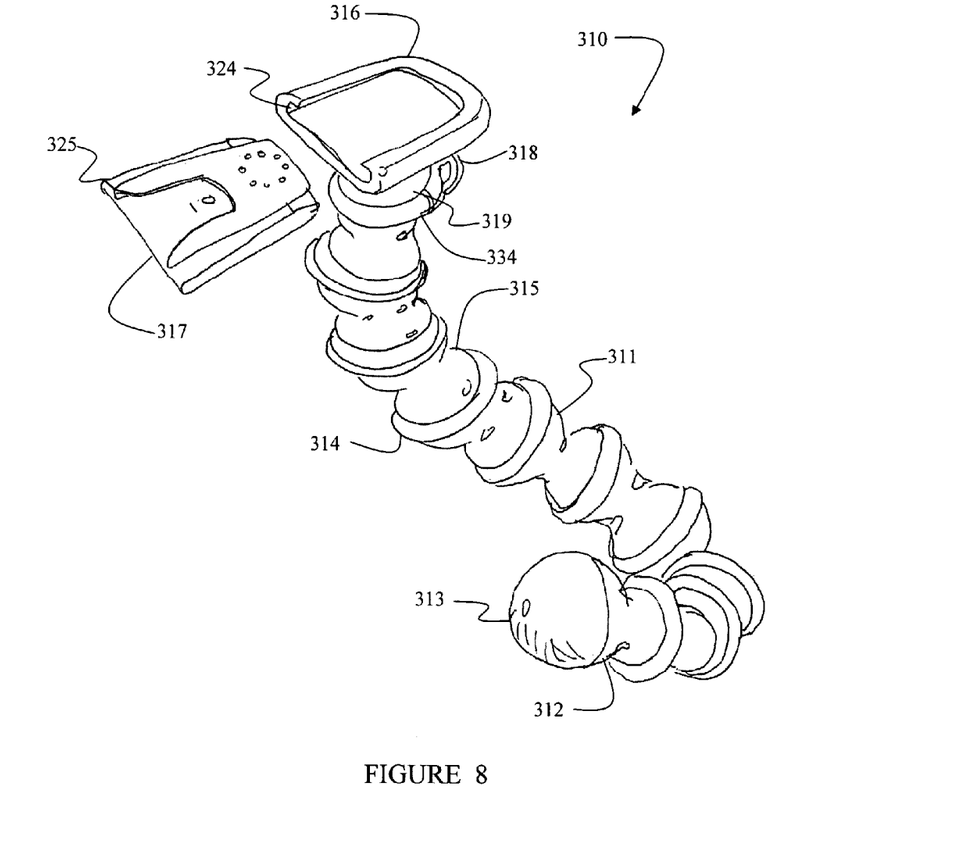
FIG. 8 is an illustration of a flexible arm assembly according to some embodiments of the present invention.

FIGS. 6 and 7 illustrates a tripod apparatus 200 according to some embodiments of the present invention. A body portion 201 provides a base of support for three flexible legs 202, 203, 204. The flexible legs 202, 203, 204 consist of a series of interconnected ball and socket joint connectors. The flexible legs are able to be flexed into a variety of positions and can be used to support the body portion 201 by forming tripod support. The flexible legs are able to adapt to uneven surfaces to allow the tripod to function in a variety of situations. Although three legs are used here for illustration, more legs may be present in some embodiments. As seen in FIG. 6, the body portion 201 itself may have a series of interconnected ball and socket joint connectors within it, allowing for even more flexibility with regard to its mounting function. The ball and socket connectors may be constructed of a variety of materials as illustrated in earlier embodiments of the present invention.

In some embodiments, the body sockets 252 are equally spaced around the center of the body portion 201. The body sockets are also flared at an angle relative to the ground (in typical usage). In some embodiments, the flared angle is 45 degrees. The flaring of the body sockets allows a different range of potential wrapping angles for the legs of the tripod.

With the flaring of the body sockets, the tripod legs may still be utilized as in the case of a typical tripod. The range of motion of the body sockets and the connectors which form the legs still allow for vertical positioning of the legs. Thus, the body portion 201 retains the tripod's usual functionality. The flaring, however, allows for greater bending of the legs in cases where the legs are used as gripping arms, such as when wrapped around vertical bars and the like. Thus the body portion 501 adds to the range of positions and to the types of uses that the apparatus may entertain.

Although the flexible legs are illustrated as functioning legs in FIG. 6, the legs are of sufficient flexibility that the may be used to wrap around items such as bars or other objects in order to fasten the tripod apparatus to objects that would not be suitable for mounting of a typical tripod. In conjunction with the gripping portion, this allows the tripod apparatus to be fastened to a variety of objects. For example, when used to position a digital camera, the legs may wrap around a vertical gate rail, allowing the mounting of the camera for a photo taking opportunity not previously available.

In some embodiments, the body portion 201 is connected to an interconnect portion 205. A clip 220 is removably fastened to the interconnect portion 205. The clip 220 may have a threaded post adapted to fit into a camera or other device in some embodiments.

In some embodiments, the flexible legs 202, 203, 204 may use connectors that have a co-molded gripping portion 208. The gripping portions 208 may allow for use of the tripod in a variety of ways, including wrapping of the legs around a post or other object. In some embodiments, the flexible legs may be terminated with a gripping pod 207. The gripping pod 207 may be fully molded into the cavity of the connector. In some embodiments, the terminal connector of each leg has a socket engaging end surface on its first end and a suction cup on its second end. The suctions cups may allow for a secure attachment of the tripod apparatus 200 to a variety of surfaces.

In some embodiments of the present invention, the interconnect portion 205 is adapted to receive a clip 220. The clip 220 may have rails adapted to slide into slots within the interconnect portion 205. The clip 220 may have recess 226 adapted to be filled by a tab 225 on a spring loaded lever 222. The clip is removably attached to the interconnect portion 205 and may be released by pressing on the lever 222. In some embodiments, the lever 222 is on the same side of the interconnect portion 205 as which the clip 220 slides in on. In other embodiments, the lever 222 is on the side opposite that which the clip 220 slides in on.

A mounting screw 221 may be recess mounted into the clip 220 in some embodiments. The screw 221 may be of the standard size and thread to attach to a camera in some embodiments. The head 223 of the screw 221 may be held into the recess by a slight ridge in the molding of the recess in some embodiments.

In some embodiments of the present invention, as seen in FIG. 7, a flexible arm 310 is adapted for twisting and flexing. In some embodiments, the flexible arm 310 consists of a plurality of interconnected connectors 311. The connectors 311 may be ball and socket connectors. The connectors 311 may be multi-material connectors according to other embodiments of the present invention. The connectors 311 may have a gripping portion 314. The gripping portion 314 may be of a rubberized compound. The gripping portion 314 allows for better friction when the flexible arm 310 is wrapped around a feature such as a pole, for example. In some embodiments, the gripping portion is co-molded into the connector body. The co-molding process may also be referred to as overmolding or double injection molding. An end connector 312 may have a gripping pod 313. The gripping pod 313 may be of rubberized compound. In some embodiments, the flexible arm 310 may have an end connector on both ends of the flexible arm. The gripping pod may also be co-molded onto the connector. In some embodiments, the connector onto which the gripping pod is overmolded may vary from the other connectors in order to be better adapted to receiving the gripping pod. Connectors that support a gripping pod may be termed a gripping pod connector.

In some embodiments of the present invention, a flexible arm, or monopod, consists of a plurality of interconnected connectors 311 with an interconnect portion 316 on one end. The interconnect portion 316 is adapted to receive a clip 317 into its opening 324. The clip 317 may be inserted into the opening 324, which will capture the rails 325 of the clip 317, which will be captured by the interconnect portion 316. In some embodiments, the clip will have a recess in its bottom surface in the shape of a slot. A spring loaded tab connected to a release lever with a button resides in the interconnect portion, allowing the clip to be pushed in and then retained as the tab first is pushed down by the insertion of the clip and then springs back up into the slot in the underside of the clamp. A spring loaded release button 318 may be pushed to release the clip 317. A rotating locking ring 334 may lock the spring loaded release button from being able to release. While a variety of different types of clips may be used with the monopod, the clip 217 shown in FIG. 7 is adapted to receive a camera flash unit.

Figure 9:
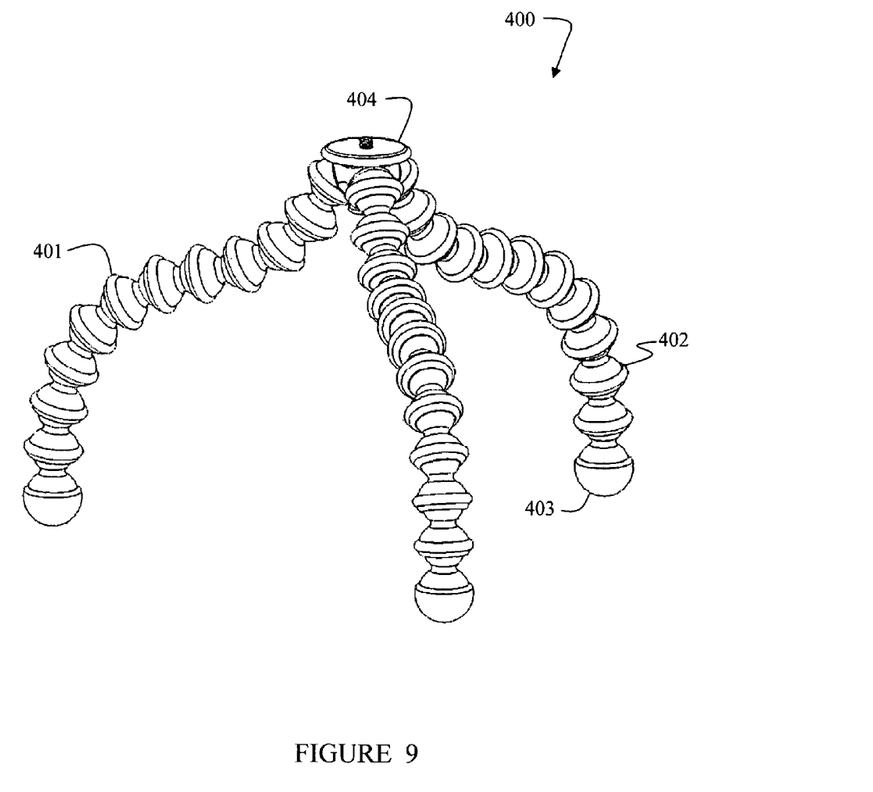
FIG. 9 is a perspective view of an apparatus according to some embodiments of the present invention.

FIG. 9 is a perspective view of an apparatus according to some embodiments of the present invention. A plurality of flexible legs 401 are connected to a main body 404 to form a tripod. The connectors 402 interconnected to form the flexible legs 401 may be composite connectors in some embodiments. A gripping pod 403 may be present at the ends of the flexible legs.

Figure 10A:
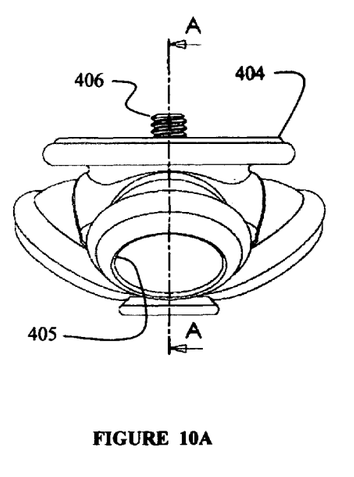
FIGS. 10A and 10B are a view and cross-section of a main body of an apparatus according to some embodiments of the present invention.
Figure 10B:
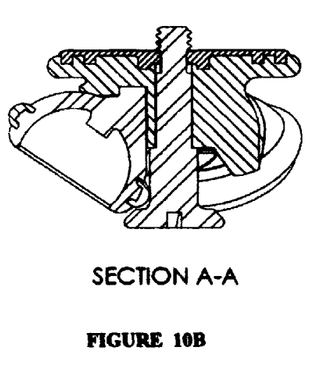

FIG. 10 is a view and cross-section of a main body of an apparatus 400 according to some embodiments of the present invention. The main body 404 has a plurality of socket receiving cavities 405 spaced around a vertical axis and splayed out at an angle from vertical. A threaded stud 406 allows for connection to a device to be supported.

As evident from the above description, a wide variety of embodiments may be configured from the description given herein and additional advantages and modifications will readily occur to those skilled in the art. The invention in its broader aspects is, therefore, not limited to the specific details and illustrative examples shown and described. Accordingly, departures from such details may be made without departing from the spirit or scope of the applicant's general invention.

I claim:

1. A tripod comprising: a body portion; an interconnect portion connected to said body portion; a clip removably attached to said interconnect portion; and a plurality of flexible legs, said flexible legs comprising a first end and a second end, said first end connected to said body portion; wherein each of said three flexible legs is composed of a multiplicity of connector pieces that join together in ball and socket joints that permit pivotable movement between connecting ball and socket components to together provide each leg with sufficient flexibility, to substantially wrap around an object, said connectors comprising: a connector body, said connector body comprising: a ball end comprising a first material;

a socket end comprising a second material;

and a gripping portion, said gripping portion attached to the outside of the socket end of said connector, wherein said gripping portion comprises a circumferential ring molded onto the outer surface of said socket end of said connector body, wherein said first material comprises plastic, and where said second material comprises metal.

2. The tripod of claim 1 wherein said ball end is molded onto said socket end.

3. The tripod of claim 1 wherein said interconnect portion comprises a lever, said lever adapted to release the removably attached clip.

4. The tripod arm of claim 3 further comprising a clip removably attached to said interconnect portion.

* * * * *